US010977172B2

(12) United States Patent
Desai et al.

(10) Patent No.: US 10,977,172 B2
(45) Date of Patent: Apr. 13, 2021

(54) MEMORY PAGE RECLAMATION IN A USER IDLE MODE

(71) Applicant: Apple Inc., Cupertino, CA (US)

(72) Inventors: Lionel D. Desai, San Francisco, CA (US); Benjamin C. Trumbull, San Jose, CA (US)

(73) Assignee: Apple Inc., Cupertino, CA (US)

( * ) Notice: Subject to any disclaimer, the term of this patent is extended or adjusted under 35 U.S.C. 154(b) by 208 days.

(21) Appl. No.: 16/147,673

(22) Filed: Sep. 29, 2018

(65) Prior Publication Data

US 2019/0370171 A1 Dec. 5, 2019

Related U.S. Application Data

(60) Provisional application No. 62/679,851, filed on Jun. 3, 2018.

(51) Int. Cl.
*G06F 12/02* (2006.01)
*G06F 12/127* (2016.01)
*G06F 12/0804* (2016.01)

(52) U.S. Cl.
CPC ...... *G06F 12/0253* (2013.01); *G06F 12/0804* (2013.01); *G06F 12/127* (2013.01); *G06F 2212/7205* (2013.01)

(58) Field of Classification Search
CPC ............... G06F 12/0253; G06F 12/127; G06F 12/0804; G06F 2212/7205
See application file for complete search history.

(56) References Cited

U.S. PATENT DOCUMENTS

| | | | |
|---|---|---|---|
| 7,996,694 B2 | 8/2011 | Bold et al. | |
| 8,225,053 B1* | 7/2012 | McCorkendale | G06F 12/08 711/159 |
| 2013/0339568 A1* | 12/2013 | Corrie | G06F 9/45558 711/6 |
| 2014/0108764 A1* | 4/2014 | Li | G06F 12/123 711/171 |
| 2014/0137105 A1* | 5/2014 | Garg | G06F 9/45558 718/1 |
| 2018/0329712 A1* | 11/2018 | Palani | G06F 12/0868 |
| 2019/0065367 A1* | 2/2019 | Li | G06F 12/0246 |
| 2019/0220418 A1* | 7/2019 | Chen | G06F 12/0882 |
| 2019/0370171 A1* | 12/2019 | Desai | G06F 12/127 |

* cited by examiner

*Primary Examiner* — Tasnima Matin
(74) *Attorney, Agent, or Firm* — Kowert, Hood, Munyon, Rankin & Goetzel, P.C.

(57) ABSTRACT

Techniques are disclosed relating to virtual memory page reclamation policies. In some embodiments, an operating system of a computing device implements, during a first operating mode, a first page reclamation policy for pages corresponding to user processes and non-user processes. The computing device may then enter a second operating mode upon detecting some indication of user inactivity. The operating system may then implement, during the second operating mode, a second page reclamation policy for pages corresponding to user processes and non-user processes, where the second page reclamation policy prioritizes, relative to the first page reclamation policy, eviction of pages corresponding to non-user processes.

20 Claims, 6 Drawing Sheets

*400*

Implement, during a first operating mode, a first page reclamation policy for pages corresponding to user processes and non-user processes
*402*

Enter a second operating mode based on an indication of inactivity of a user of the computing device
*404*

Implement, during the second operating mode, a second page reclamation policy for pages corresponding to user processes and non-user processes, where the second page reclamation policy prioritizes, relative to the first page reclamation policy, eviction of pages corresponding to non-user processes
*406*

```
┌─────────────────────────────────────────────┐
│ Maintain, by an operating system of a       │
│ computing device during a first operating   │
│ mode, an indication that a plurality of     │
│ pages corresponding to user processes are   │
│ stored in a memory of the computing device  │
│                    502                      │
└─────────────────────────────────────────────┘
                      │
                      ▼
┌─────────────────────────────────────────────┐
│ Enter a second operating mode responsive to │
│ detecting user inactivity with respect to   │
│ the computer system                         │
│                    504                      │
└─────────────────────────────────────────────┘
                      │
                      ▼
┌─────────────────────────────────────────────┐
│ Implement, by the operating system during   │
│ the second operating mode, a different      │
│ paging policy from a previous paging policy │
│ used in the first operating mode, where the │
│ different paging policy attempts to         │
│ maintain, in memory, a greatest number of   │
│ the plurality of pages corresponding to     │
│ user processes                              │
│                    506                      │
└─────────────────────────────────────────────┘
                      │
                      ▼
┌─────────────────────────────────────────────┐
│ Upon exiting the second operating mode in   │
│ response to an indication of user activity, │
│ return to the first operating mode and      │
│ re-implementing the previous paging policy  │
│                    508                      │
└─────────────────────────────────────────────┘
```

*FIG. 5*

MEMORY PAGE RECLAMATION IN A USER IDLE MODE

The present application claims priority to U.S. Provisional Appl. No. 62/679,851, filed Jun. 3, 2018, which is incorporated by reference herein in its entirety.

BACKGROUND

Technical Field

This disclosure relates generally to the field of computer memory and, more particularly, to virtual memory page reclamation while a computing device is operating in a state of user inactivity.

Description of the Related Art

Modern computing devices typically implement a virtual memory system in which primary storage (i.e., main memory), such as random access memory (RAM), is used as a cache for secondary storage such as hard disk drives, optical drives, etc. To process a request to access a particular memory location, a memory management unit (MMU) may receive a virtual memory address of the particular memory location and translate the virtual address to a corresponding physical address in memory. The MMU may then reference the physical address to retrieve the desired data.

Mappings for virtual addresses to physical addresses are typically stored in a data structure called a page table. A mapping may be inserted when an operating system loads a set of data (called a page) from secondary storage into primary storage. In some instances, a page fault may occur when an MMU is unable to determine the physical address for a given virtual address, for example because the page table does not include a mapping for that address, the mapping is no longer valid, etc. A central processor unit (CPU) may handle a page fault by invoking the operating system to retrieve the requested data from secondary storage. Servicing a page fault, however, can take a significant amount of time, e.g., to retrieve the data from secondary storage, write it into primary storage, insert a corresponding mapping into the page table, etc. Further, in the event that all the pages in primary storage are in use, the operating system may need to select one or more existing pages to "evict" or replace before the data from secondary storage can be written to primary storage. In various instances, it may be desirable to evict pages from primary storage in a way that minimizes delay to user applications due to page faults.

SUMMARY

Techniques are disclosed relating to virtual memory page reclamation policies. In some embodiments, an operating system of a computing device implements, during a first operating mode, a first page reclamation policy for pages corresponding to user processes and non-user processes. Some of the non-user processes may include background processes that are performed on behalf of the user (e.g., maintenance tasks), while other processes are system processes. The computing device may then enter a second operating mode based on an indication of user inactivity. The operating system may then implement, during the second operating mode, a second page reclamation policy for pages corresponding to user processes and non-user processes. In various embodiments, the second page reclamation policy prioritizes, relative to the first page reclamation policy, eviction of pages corresponding to non-user processes. For example, in some embodiments, the second page reclamation policy evicts a higher percentage of pages corresponding to background processes than pages corresponding to user processes. Implementing the second page reclamation policy thus allows a system to prioritize processes that a user was running when a period of user inactivity began, for example by throttling processes scheduled to run overnight, during idle time, etc. This policy is designed to minimize perturbing the previously user-visible state of the machine so that when the user returns to the machine the performance of their previous work is optimal as possible despite sharing the same computing resources (e.g., memory and virtual memory) with these non-user processes, even if these processes have been running for many hours.

BRIEF DESCRIPTION OF THE DRAWINGS

FIGS. 4 and 5 are flow diagrams illustrating example methods for implementing virtual memory page reclamation policies, according to some embodiments.

Figure 1A:
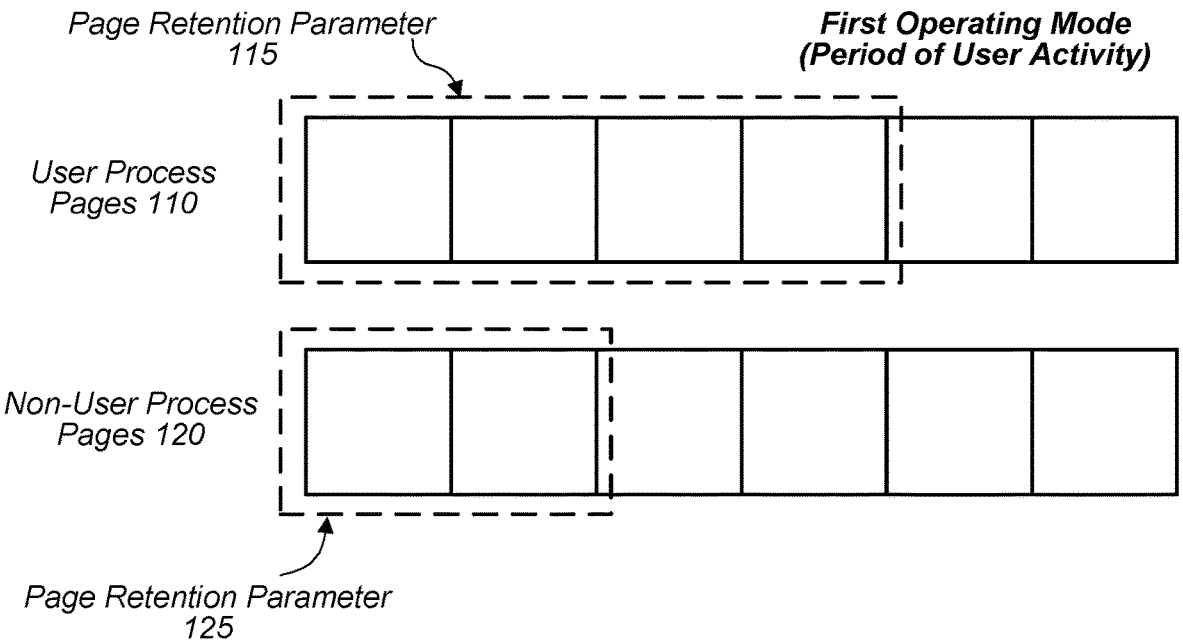
FIGS. 1A-1B are block diagrams respectively illustrating first and second page reclamation policies, according to some embodiments.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

Although specific embodiments are described below, these embodiments are not intended to limit the scope of the present disclosure, even where only a single embodiment is described with respect to a particular feature. Examples of features provided in the disclosure are intended to be illustrative rather than restrictive unless stated otherwise. The description herein is intended to cover such alternatives, modifications, and equivalents as would be apparent to a person skilled in the art having the benefit of this disclosure.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. Rather, this application is intended to cover all modifications, equivalents, and alternatives falling within the spirit and scope of the disclosure of the present application as defined by the appended claims. The headings used herein are for organizational purposes only and are not meant to be used to limit the scope of the description.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory management unit configured to translate virtual memory addresses into corresponding physical addresses" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

DETAILED DESCRIPTION

During operation, a computing device may perform various types of processes concurrently, including both user processes and non-user processes. Further, modern computing devices typically implement a virtual memory system in which main memory is used as a cache to store data (e.g., data for user and non-user processes) from secondary storage. As such, in performing the various processes, the computing device stores pages of data for these processes in main memory. Once all available pages in main memory are in use, the operating system will typically need to select pages to evict from main memory to make room for newly requested data. An operating system may implement various page reclamation policies in determining which pages to evict from main memory. As used herein, the term "page reclamation policy" refers to an implementation that determines the manner in which pages are selected for eviction from main memory. In some embodiments, for example, a page reclamation policy may be implemented based on a set of rules and parameters specifying the manner in which pages are selected for eviction. For example, an operating system may implement a least-recently used (LRU) page reclamation policy in which the least-recently used page is evicted from memory to provide space for new data. This and other page reclamation policies suffer from various shortcomings.

For instance, conventional page reclamation policies may evict from memory those pages associated with user applications, resulting in subsequent page faults, and therefore cause delay when the user attempts to use those user applications. For example, consider an instance in which, after using various user applications, a user stops using a computing device for an extended period (e.g., several hours) with one or more of the user applications (and thus the corresponding user processes) still active. After some indication of user inactivity (e.g., a time threshold or an explicit lock command issued by the user), the computing device may transition into a different operating mode indicative of the user inactivity. During these periods of user idle time, the computing device can advantageously perform other types of processes, referred to herein as "non-user processes." (Note, however, that during these portions of user idle time, one or more processors of the computing device may be in their full power state.) These non-user processes can include background (or maintenance) processes as well as processes initiated by or on behalf of the operating system. Examples of background processes include cloud sync tasks, search indexing, photo processing, backups, and any customs requests registered by an application to run at idle time or which are scheduled at a later date. Examples of system processes include push notification handling, DHCP lease renewal, as well as many other system daemons that are typically always running. In performing these non-user processes during user idle time, however, conventional page reclamation policies may evict pages corresponding to user processes from main memory. In some instances, such conventional page reclamation policies may evict from main memory all or a substantial amount of the pages corresponding to user processes. This, in turn, will result in page faults, and the associated delay to service those page faults, when the user subsequently attempts to use the user applications corresponding to those user processes after the computing device has been in the operating mode corresponding to user inactivity. The paradigms discussed below, however, may allow for a quicker resumption of user processing when the period of user inactivity ends, which may be detected based on a triggering event such as user input received via an I/O device of the computing system.

Figure 1B:
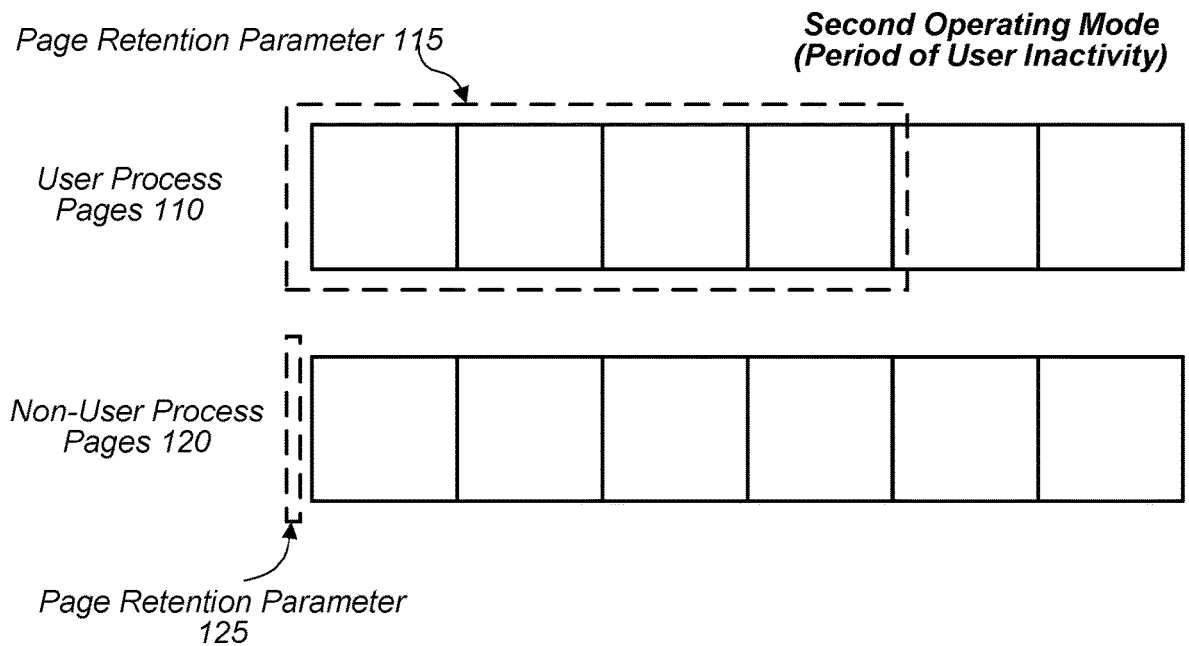

Referring now to FIGS. 1A-1B, block diagrams of a first page reclamation policy 100 and a second page reclamation policy 150 implemented by a computing device are respectively depicted, according to one embodiment of the present disclosure. FIGS. 1A-1B depict both user process pages 110 (that is, pages in main memory associated with user processes) and non-user process pages 120 (pages in main memory associated with non-user processes). As used herein, the term "user process" refers to a process that is initiated by a user and is active when the computing device transitions from the first operating mode that corresponds to a period of user activity to a second operating mode that corresponds to a period of user inactivity. Thus, a user process may correspond to one or more of various user applications initiated by a user, such as an email client, a web browser, a calendar application, etc. Note that, in various embodiments, execution of a user application may result in multiple user processes being performed by the computing device. That is, in some embodiments, a given user application may have multiple user processes associated with the user application. In some instances, user processes may be considered to be "foreground" processes, as opposed to processes scheduled to run during periods of downtime.

As used herein, "user processes" are distinguished from "non-user processes," which, as used herein, broadly refers to any process that is not a user process. In various embodiments, the term "non-user process" may encompass multiple different types or categories of processes, such as system processes and background processes. A "system process," as used herein, refers to a process that is initiated by and "belongs to" an operating system of the computing device. In some embodiments, for example, system processes may include maintaining a network connection state, scheduling processes for execution, etc. A "background process," as described above and as is known in the art, refers to a process that is scheduled by the user to be run in the background. As noted above, an example of a background process is a cloud backup job that is scheduled to be run overnight.

In the depicted embodiment, first and second page reclamation policies 100 and 150 are policies specifying the manner in which virtual memory page eviction is performed while a computing device is operating in a first operating mode and a second operating mode, respectively. That is, as shown in FIG. 1A, first page reclamation policy 100 is implemented while the computing device is in the first operating mode.

FIGS. 1A-1B also depict page retention parameters 115 and 125, respectively associated with user process pages 110 and non-user process pages 120. In various embodiments, as pages are allocated for a process, those pages are categorized and tagged (e.g., in a page table) based on the type of process for which they were allocated (e.g., a user process, background process, system process, etc.). Page retention parameters 115 and 125, in various embodiments, refer to a target amount (e.g., number, percentage, etc.) of pages, within a particular category of pages (e.g., user process pages, background process pages, system process pages, etc.), to retain in main memory during a particular operating mode. For example, in the simplified embodiment of FIG. 1A, first page reclamation policy 100 specifies that the page retention parameter 115 for user process pages 110 is four, meaning that, as pages are evicted from main memory, the operating system will retain at least four user process pages 110 in main memory during the first operating mode. Similarly, in FIG. 1A, first page reclamation policy 100 specifies that the page retention parameter 125 for non-user process pages 120 is two, meaning that, as pages are evicted from main memory, the operating system will retain at least two non-user process pages 120 in main memory during the first operating mode. Note that these simplified examples are provided merely to facilitate discussion of the present disclosure. Further note that, although page retention parameter 115 is greater than page retention parameter 125 in the depicted embodiment, this is embodiment is provided merely as one example. In other embodiments, first page reclamation policy 100 may specify the page retention parameter 125 to be equal to or greater than the page retention parameter 115 as desired.

In various embodiments of the present disclosure, the computing device may implement a different page reclamation policy when the computing device is operating in a first operating mode than when the computing device is operating in a second operating mode that corresponds to a period of user inactivity. For example, as shown in FIG. 1B, the depicted embodiment implements second page reclamation policy 150 while the computing device is operating in the second operating mode. In various embodiments, second page reclamation policy 150 prioritizes, relative to first page reclamation policy 100, eviction of pages corresponding to non-user processes over pages corresponding to user processes. For example, like first page reclamation policy 100, second page reclamation policy 150 also specifies page retention parameters 115 and 125. In second page reclamation policy 150, however, the page retention parameter 125 for non-user process pages 120 has been reduced to 0. Accordingly, as pages are evicted from main memory while the computing device is in the second operating mode, the second page reclamation policy 150 does not guarantee the retention of any non-user process pages 120, in the illustrated embodiment.

As will be discussed in more detail below, in various embodiments, first and second page reclamation policies 100 and 150 may further distinguish between the types of non-user process pages 120. For example, in some embodiments, page retention parameter 125 may specify an amount of pages corresponding to background processes to retain in main memory, instead of or in addition to pages corresponding to other types of non-user processes, such as system processes. In some such embodiments, implementing the second page reclamation policy 150 causes the operating system to evict a higher percentage of pages corresponding to background processes than user process pages 110. Note that, although page retention parameter 125 has been reduced to 0 in FIG. 1B, this embodiment is provided merely as an example. In other embodiments, page retention parameter 125 may be reduced to a value greater than 0 but still lower than its value in first page reclamation policy 100.

The present disclosure addresses technical problems in the field of computer memory and, more specifically, in the field of virtual memory page reclamation. For example, as discussed above, when a computing device is operating in a second operating mode that corresponds to a period of user inactivity, conventional page reclamation policies may evict all, or a substantial amount, of the pages in main memory that correspond to user processes that were in use before the computing device entered the period of user inactivity. When the user subsequently attempts to use the computing device, in such instances, the main memory will no longer store the pages for those user processes, resulting in a delay while the operating system services these page faults.

In various embodiments of the present disclosure, however, a computing device implements a second page reclamation policy (e.g., policy 150) while the computing device is in a second operating mode that corresponds to a period of user inactivity, where the second page reclamation policy prioritizes the eviction of pages corresponding to non-user processes (e.g., background processes) rather than pages corresponding to user processes. Such a second page reclamation policy, in various embodiments, ensures that pages corresponding to user processes remain stored in main memory when the computing device returns to a first operating mode, reducing page faults and their attendant delay for the user applications. Thus, the disclosed systems and methods, in at least some embodiments, improve virtual memory page reclamation by prioritizing, while the computing device is operating in a second power mode that corresponds to a period of user inactivity, the eviction of pages corresponding to non-user processes, reducing delay in the user experience and improving the functioning of the computing device as a whole.

Figure 2:
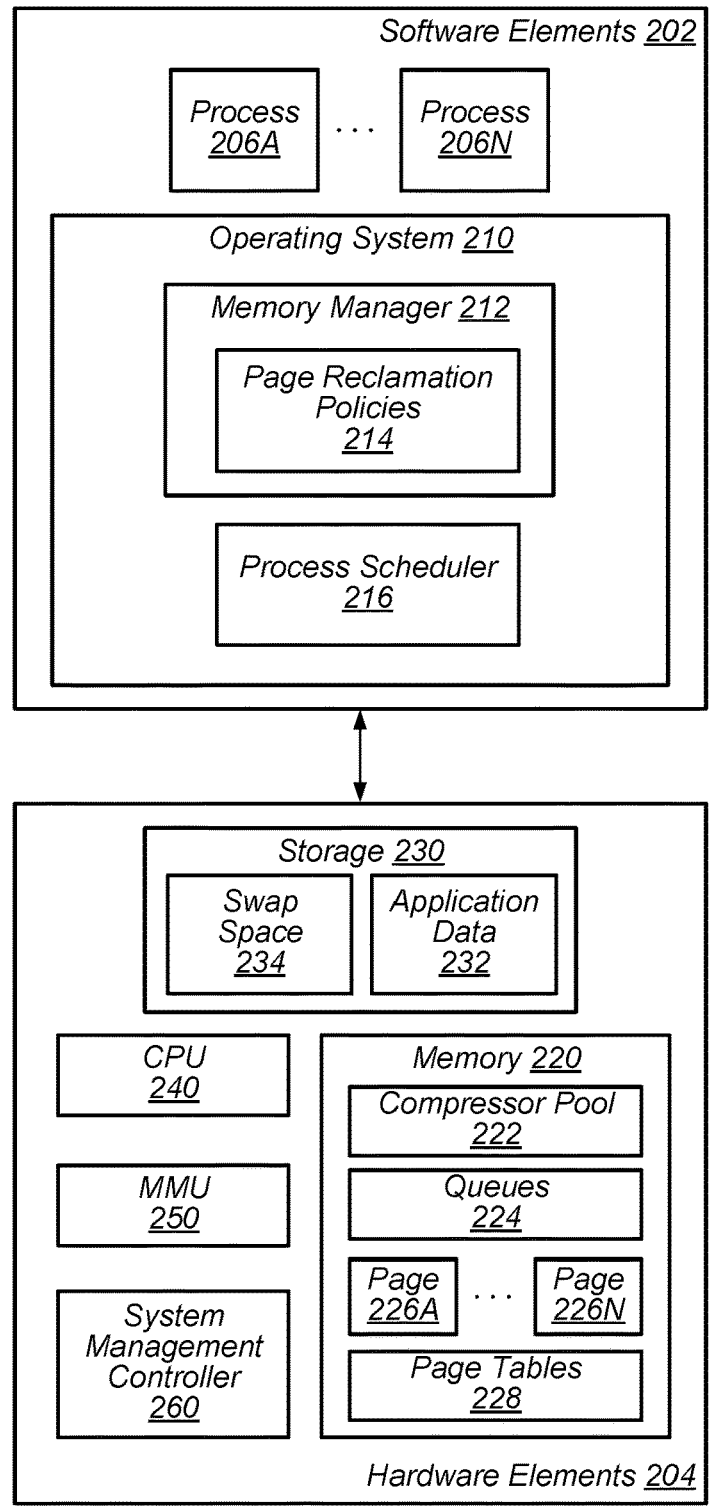
FIG. 2 is a block diagram illustrating an example computing device, according to some embodiments.

Turning now to FIG. 2, a block diagram illustrating aspects of a computing device 200 is depicted. In the illustrated embodiment, computing device 200 includes software elements 202 and hardware elements 204. In various embodiments, computing device 200 corresponds to a device on which the disclosed page reclamation policies (e.g., policies 100 and 150) may be implemented.

Software elements 202 includes a plurality of processes 206A-206N and operating system 210. Operating system 210, in various embodiments, is executable to manage operation of computing device 200. For example, operating system 210 includes process scheduler 216, which is executable to schedule various processes (e.g., processes 206A-206N) to be executed by the CPU 240. Processes 206A-206N may be one or more of any suitable type of process, such as a user process, background process, system process, etc. Note that, in some instances, different types of processes (e.g., user processes and background processes) may be performed at the same time, as desired. Operating system 210 further includes memory manager 212, which, in various embodiments, is executable to implement various page reclamation policies 214 based on an operating mode in which computing device 200 is operating, as discussed below.

Hardware elements 204, in the illustrated embodiment, include memory 220, storage 230, CPU 240, memory management unit (MMU) 250, and system management controller 260. In various embodiments, CPU 240 is configured to execute instructions to implement various aspects of software elements 202. For example, CPU 240, in some embodiments, is configured to execute instructions of operating system 210 to facilitate implementation of a virtual memory. Operating system 210, in various embodiments, maintains one or more page tables 228 in memory 220 that include translations for virtual addresses to corresponding physical addresses in memory 220. MMU 250, in various embodiments, is configured to receive memory requests and to translate the virtual addresses specified in those requests to corresponding physical addresses usable to retrieve data from memory 220 (e.g., from one or more pages 226A-226N). In various embodiments, MMU 250 may include a table walk unit configured to retrieve translations from one or more page tables 228 in memory 220 for localized storage in MMU 250.

In the illustrated embodiment, memory 220 is shown with a plurality of pages 226A-226N (collectively "pages 226") stored thereon. When MMU 250 is able to determine a valid physical address from a virtual memory address, then the requested data may be retrieved from one or more of the pages 226 stored in memory 220 without having to retrieve the data from storage 230. In the event of a page fault, however, CPU 240 (or MMU 250, in various embodiments) may invoke operating system 210 to service the page fault, e.g., by retrieving one or more pages of data from storage 230 (e.g., from application data 232). Once operating system 210 retrieves the requested pages from storage 230, it must determine where in memory 220 to store the requested pages. In the event that all the pages in memory 220 are in use, operating system 210, in various embodiments, must select one or more existing pages to evict (e.g., based on one or more page reclamation policies) before the requested data from storage 230 can be written to memory 220. Having retrieved the requested data from storage 230, operating system 210 may correspondingly update page tables 228 to include translations for the newly added pages and may remove translations for any pages that were evicted.

Memory 220 further includes queues 224, which, in various embodiments, specify pages 226 stored in memory 220 based on the category to which their respective processes belong. For example, as noted above, as a page 226 is allocated for a process, it is categorized based on the nature of the process. For example, if the process is a user process (e.g., a process corresponding to an email client), the pages 226 allocated for that process are categorized and designated (e.g., within a field of one or more page tables 228) as pages for a user process. Similarly, if the process is a background process (e.g., backing up files to a remote storage device) or a system process (e.g., maintaining a network connection), the pages 226 allocated for that process are categorized and designated as pages for a non-user process (e.g., a background process or a system process, respectively).

In various embodiments, operating system 210 maintains the various queues 224 that specify the pages 226 in memory 220 that belong to each of the various categories. For example, in various embodiments, queues 224 include an "active queue" for pages associated with user processes and an "inactive queue" for pages associated with non-user processes. In various embodiments, the inactive queue may further be differentiated into multiple queues for different types of non-user processes. For example, in some embodiments, the inactive queue includes a "background queue" for pages associated with background processes, a "system queue" for pages associated with system processes, etc. In some embodiments, queues 224 may be implemented as a linked list maintained by operating system 210. Note, however, that this embodiment is provided merely as an example and, in other embodiments, any suitable data structure may be used to implement queues 224, as desired.

In various embodiments, computing device 200 is configured to implement various page reclamation policies (e.g., policies 100 and 150) based on an operating mode in which the device 200 is operating. For example, hardware elements 204 includes system management controller 260, which, in various embodiments, is configured to control various aspects of power management for computing device 200, such as the operating mode in which computing device 200 operates at a given time. For example, after receiving some indication of user inactivity (e.g., a timeout threshold or an explicit lockout command), system management controller 260 may transition the computing device 200 into a second operating mode corresponding to this user inactivity, as discussed above. In various embodiments, memory manager 212 may receive an indication (e.g., from system management controller 260) of the operating mode in which computing device 200 is currently operating. Such indications may be received or determined, for example, periodically after a given interval, as computing device 200 transitions between operating modes, etc. Based on the operating mode of computing device 200, memory manager 212 may implement one or more page reclamation policies 214, which may include policies 100 and 150 discussed above.

For example, while computing device 200 is operating in a first operating mode, memory manager 212 may implement a first page reclamation policy 100, which, as discussed above, includes various page retention parameters. For example, page reclamation policy 100 discussed above includes page retention parameters 115 and 125, respectively corresponding to user process pages 110 and non-user process pages 120. As noted above, page retention parameter 115 specifies the number of pages corresponding to user processes (e.g., as indicated by the active queue) to retain in memory 220, and page retention parameter 125 specifies the number of pages corresponding to non-user processes (e.g., as indicated by the inactive queue) to retain in memory 220. In first page reclamation policy 100, in various embodiments, parameters 115 and 125 specify the number of respective pages to retain in memory while computing device 200 is operating in a first operating mode.

While computing device 200 operates in the first operating mode that corresponds to a period of user activity, operating system 210 may perform paging operations based on the first page reclamation policy 100 such that, as pages 226 are moved to and evicted from memory 220, a sufficient number of pages for user processes and non-user processes are retained in memory to satisfy the quantities specified by parameters 115 and 125. In various embodiments, computing device 200 may be placed in a second operating mode that corresponds to a user idle time, from the first operating mode, in response to various events (e.g., user inactivity, user command, according to a schedule, etc.). As computing device 200 operates in the second operating mode, operating system 210, in various embodiments of the present disclosure, performs paging based on a second page reclamation policy 150. As noted above, second page reclamation policy 150 prioritizes, relative to policy 100, the eviction of pages corresponding to non-user processes. In policy 150, in some embodiments, one or more of the page retention parameters may be adjusted to achieve such prioritization. For example, in policy 150, page retention parameter 125 may be reduced (e.g., by a certain percentage, to a certain value, etc.) such that it does not require that any pages for the non-user processes be kept in memory 220. Further, in some embodiments, page retention parameter 125 may, more specifically, correspond to the retention of background pages in memory 220. In such embodiments, in policy 150, page retention parameter 125 may be reduced such that no amount of background pages are guaranteed to be retained in memory 220 while computing device 200 operates in the second operating mode. Accordingly, as operating system 210 evicts pages 226 from memory 220 based on policy 150, it will start doing so with the pages 226 for non-user processes (e.g., the pages in the background queue).

As discussed above, while computing device 200 is operating in a second operating mode, various processes may be performed. For example, during these periods of user idle time, computing device 200 may advantageously perform non-user processes, such as background processes and system processes. In various embodiments, page reclamation policy 150 may specify that every process that is initiated while computing device 200 is operating in the second operating mode is to be designated (e.g., using a reference bit) as an "idle process," as these processes are initiated during a period of user idle time. Further, in various embodiments, policy 150 may further specify that each of the pages allocated for an idle process is to be designated as a page corresponding to a background process and, as such, be included in the background queue. Note that, in various embodiments, the pages allocated for the idle processes may be designated as pages corresponding to background processes even if the corresponding idle process is not a background process. For example, in some embodiments, a system process may be initiated while the computing device 200 is operating in the second operating mode. In such embodiments, that system process may be designated as an idle process, and the pages allocated for it may be designated as pages for a background process.

Thus, in various embodiments, as computing device 200 operates in the second operating mode and idle processes are performed, the pages for those idle processes are designated as pages for background processes. Further, in various embodiments, in policy 150, page retention parameter 125 is adjusted such that no background pages are guaranteed to be retained in memory 220 while computing device 200 operates in the second operating mode. Accordingly, as the idle processes are performed, the policy 150 prioritizes the eviction of the pages in the background queue in response to page faults. For example, as discussed in more detail with reference to FIG. 3, in response to a page fault, operating system 210 may select one or more pages from the background queue to evict to compressor pool 222. In some embodiments, the one or more evicted background pages may be moved to the front of a swap queue within compressor pool 222. Further, as compressor pool 222 becomes full, operating system 210 may move one or more background pages from the front of the swap queue to swap space 234 on storage 230. Note that, in various embodiments, storage 230 and swap space 234 may be implemented using any suitable storage device. In one embodiment, for example, storage 230 is a hard disk drive and swap space 234 corresponds to a partition on that hard disk drive. In another embodiment, for example, storage 230 is a hybrid storage device that includes both a solid-state drive (e.g., a NAND flash memory) and a hard disk drive. In such an embodiment, swap space 234 may be implemented as part of the solid-state drive on storage 230.

Note that, while operating in the first operating mode, in various embodiments, the inactive queue may contain pages for background processes and system processes, for example within respective background and system queues. After operating system 210 transitions to second page reclamation policy 150 (that is, during a second operating mode), the pages for the idle processes are designated as background pages. In various embodiments, however, the pages for system processes that were in the inactive queue at the time computing device 200 went into the second operating mode may remain designated as pages for a system process (e.g., in a system queue). Thus, in such embodiments, those system processes that were in progress during the transition from the first operating mode to the second operating mode may not be designated as idle processes and, accordingly, the pages for those system processes will not be designated as background processes. Stated differently, in some embodiments, the pages corresponding to system processes that were being performed when the computing device 200 transitioned from the first operating mode into the second operating mode will not be designated as background pages for which, under policy 150, eviction is prioritized.

Further note that, although only three categories of processes are specifically listed herein ("user processes," "background processes," and "system processes"), such embodiments are provided merely as examples and are not intended to limit the scope of this disclosure. In other embodiments, additional or fewer categories of processes may be implemented without departing from the scope of the present disclosure. In various embodiments, however, the categories utilized are usable to distinguish between user processes (and pages for user processes) and non-user processes (and, therefore, pages for non-user processes) such that, during a second operating mode, the operating system 210 may implement a page reclamation policy that prioritizes eviction of pages corresponding to non-user processes rather than pages corresponding to user processes.

Figure 3:
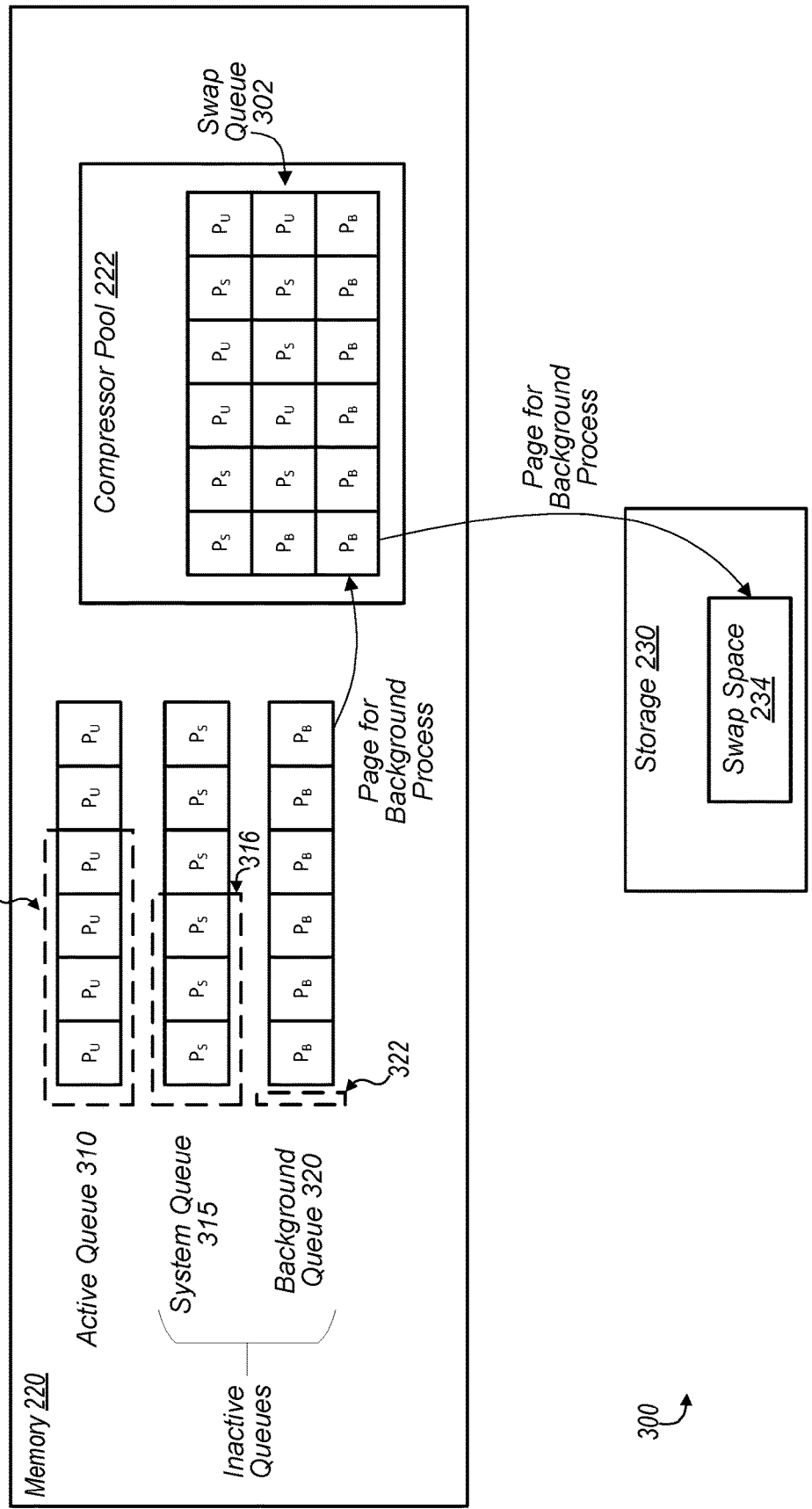
FIG. 3 is a block diagram illustrating an example implementation of a page reclamation policy while a computing device operates in a second operating mode that corresponds to a period of user inactivity, according to some embodiments.

Referring now to FIG. 3, block diagram 300 depicts an example implementation of a page reclamation policy 150 while a computing device 200 operates in a second operating mode. In the illustrated embodiment, memory 220 includes three queues: active queue 310, system queue 315, and background queue 320. In various embodiments, queues 310, 315, and 320 are lists, maintained by operating system 210, that specify the pages stored in memory 220 categorized based on the processes for which they were allocated.

As shown in FIG. 3, each of queues 310, 315, and 320 includes a plurality of pages. For example, active queue 310 includes a plurality of pages corresponding to user processes ("Pu"), system queue 315 includes a plurality of pages corresponding to system processes ("Ps"), and background queue 320 includes a plurality of pages corresponding to background pages ("PB"). Note that, although each of queues 310, 315, and 320 are shown as being the same size in FIG. 3, this embodiment is provided merely as an example and is not intended to limit the scope of this disclosure. In other embodiments, the relative sizes of the queues 310, 315, and 320 (or other queues not depicted in FIG. 3) may be assigned in any suitable manner as desired. Further note that, as shown in FIG. 3, each of queues 310, 315, and 320 are full. Accordingly, in response to a page fault, in the depicted embodiment, operating system 210 must select one or more pages to evict from memory 220.

Each of queues 310, 315, and 320 has a respective page retention parameter specified by second page reclamation policy 150, in the embodiment of FIG. 3. For example, active queue 310 has page retention parameter 312, system queue 315 has page retention parameter 316, and background queue 320 has page retention parameter 322. In the illustrated embodiment, page retention parameter 322 has been reduced, relative to first page reclamation policy 100, to zero. As operating system 210 begins evicting pages based on second page reclamation policy 150, in various embodiments, it may start with the pages in the background queue 320. For example, in the illustrated embodiment, operating system 210 may move one or more (e.g., 1, 8, 64, etc.) pages corresponding to background processes to the front of swap queue 302 of compressor pool 222. In various embodiments, swap queue 302 is a queue (e.g., list) of compressed pages stored in memory 220, where the order in which the compressed pages are moved to swap space 234 is based on their respective positions in swap queue 302. Further, in various embodiments, as compressor pool 222 becomes full, pages may be moved from the front of the swap queue 302 to swap space 234 (e.g., on a flash memory device, hard disk drive, etc.). For example, in FIG. 3, pages for background processes are moved from the front of the swap queue 302 to swap space 234.

In various embodiments, pages that have been evicted to swap space 234 may be later retrieved and moved, for example, to compressor pool 222. In some such embodiments, the one or more pages recovered from swap space 234 may be moved back to the front of the swap queue 302 such that, in the event that additional pages need to be evicted from compressor pool 222, the recovered pages may be the first to be evicted.

Note that, in various embodiments, it is only after all pages in background queue 320 have been evicted from memory 220 that operating system 210 begins evicting pages from system queue 315 or active queue 310. Further, as discussed in more detail below with reference to FIG. 4, in some embodiments, the page retention parameter 312 in page reclamation policy 150 may be increased to ensure that all pages corresponding to user processes stored in memory 220 when computing device 200 transitions into second operating mode are retained in memory 220 until computing device 200 returns to the first operating mode.

Example Methods

Turning now to FIG. 4, a flow diagram illustrating an example method 400 for implementing various page reclamation policies based on an operating mode of a computing device is depicted. In various embodiments, method 400 may be performed by computing device 200 of FIG. 2, which may include (or have access to) a non-transitory, computer-readable medium having program instructions stored thereon that are executable by the computing device 200 to cause the operations described with reference to FIG. 4. FIG. 4 includes elements 402-406. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, an operating system of a computing device implements, during a first operating mode, a first page reclamation policy for pages corresponding to user processes and non-user processes. For example, in some embodiments, operating system 210 of computing device 200 may implement first page reclamation policy 100 while computing device 200 is in a first operating mode (e.g., when a user inactivity threshold has not been reached, such as when the user is interacting with computing device 200). As discussed above, the non-user processes may include various types of processes, such as background processes, system processes, etc.

At 404, in the illustrated embodiment, the computing device enters a second operating mode based on an indication of inactivity of a user of the computing device. For example, computing device 200 may enter the second operating mode after no user input has been received for some time period.

At 406, in the illustrated embodiment, the operating system implements, during the second operating mode, a second page reclamation policy (e.g., policy 150) for pages corresponding to user processes and non-user processes, wherein the second page reclamation policy prioritizes, relative to the first page reclamation policy, eviction of pages corresponding to non-user processes. For example, first page reclamation policy 100 may specify a first page retention parameter for pages corresponding to background processes and second page reclamation policy 150 may specify a second, lower page retention parameter for the pages corresponding to background processes. (These retention parameters may also correspond to non-user processes generally, including system processes in various embodiments.) The second, lower page retention parameter, in various embodiments, specifies an amount of pages corresponding to background processes (or non-user processes) to retain in memory during the second operating mode. Further, in some embodiments, during implementation of the second page reclamation policy, the second, lower page retention parameter may not require that any pages for the non-user processes (e.g., background processes) be kept in memory. Further, in various embodiments, the first page reclamation policy specifies a third page retention parameter for pages corresponding to user processes to retain in memory during the first operating mode, and the second page reclamation policy specifies a fourth page retention parameter for pages corresponding to user processes to retain in memory during the second operating mode. In some such embodiments, the fourth page retention parameter is greater than the third page retention parameter.

In various embodiments, element 406 may include detecting, by the operating system (e.g., operating system 210) initiation of a first non-user process during the second operating mode and designating, by the operating system, a plurality of pages allocated to the first non-user process as pages corresponding to a background process. For example, in some embodiments, the first non-user process is a system process. Further, in various embodiments, element 406 may further include, in response to a page fault, moving, by the operating system, one or more pages corresponding to non-user processes to a front of a swap queue in a compressor pool.

In various embodiments, the second page reclamation policy causes, relative to the first page reclamation policy, eviction of a higher percentage of pages corresponding to background processes than pages corresponding to user processes such that, when the computing device transitions back to the first operating mode from the second operating mode, the greatest number of the plurality of pages corresponding to user processes remain stored in memory. Accordingly, when the computing device returns to the first operating mode in response to a triggering event (e.g., a keystroke) and, a large percentage (and potentially all) of the plurality of pages corresponding to user processes remain stored in memory.

Referring now to FIG. 5, a flow diagram of a method 500 is depicted. As noted, method 400 above depicts a flowchart of an example method. FIG. 5 depicts a flow diagram of another method 500 for performing virtual memory page reclamation. In various embodiments, method 500 may be performed by computing device 200 of FIG. 2, which may include (or have access to) a non-transitory, computer-readable medium having program instructions stored thereon that are executable by the computing device 200 to cause the operations described with reference to FIG. 5. FIG. 5 includes elements 502-508. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, an operating system of a computing device maintains, during a first operating mode, an indication that a plurality of pages corresponding to user processes are stored in a memory (e.g., memory 220) of the computing device. For example, in some embodiments, the operating system may implement, during the first operating mode, a first page reclamation policy that specifies first page retention parameters for user processes and non-user processes. At 504, in the illustrated embodiment, the computing device enters a second operating mode responsive to detecting user inactivity with respect to the computing device—for example, a time threshold of no user input to an I/O device, such as a keyboard or pointing device, is reached. Note, however, that this embodiment is provided merely as an example and is not intended to limit the scope of the present disclosure. In other embodiments, for example, the computing device may enter a second operating mode responsive to detecting that the user has provided input "locking" the computing device, placing the computing device in a "Do Not Disturb" setting, etc. Further, in some embodiments, data regarding usage of the computing device (e.g., the times during which the computing device is inactive, the length of user inactivity, etc.) may be maintained and machine learning principles may be applied to determine when to enter the second operating mode.

At 506, in the illustrated embodiment, the operating system implements, during the second operating mode, a different paging policy from a previous paging policy used in the first operating mode, where the different paging policy attempts to maintain, in memory, a greatest number of the plurality of pages corresponding to user processes. For example, in some embodiments, the operating system may, during the second operating mode, implement a second page reclamation policy that specifies second page retention parameters for user processes and non-user processes, where the second page retention parameters differ from the first page retention parameters to increase, relative to the first operating mode, a percentage of evicted pages that correspond to non-user processes. In some embodiments, implementation of the different paging policy may cause all of the plurality of pages corresponding to user processes to be preserved in the memory of the computing device. Further, in some embodiments, the different paging policy may have no minimum page retention parameter for pages corresponding to non-user processes. Note that, in some embodiments, second page reclamation policy may further prioritize the preservation of pages for some user processes over pages for other user processes. For example, in such embodiments, the second page reclamation policy may retain a higher percentage of pages for user processes that are frequently used (e.g., a web browser, an email client, etc.) relative to pages for user processes that are less-frequently used (e.g., a spreadsheet application). At 508, in the illustrated embodiment, the computing device, upon exiting the second operating mode in response to an indication of user activity (e.g., input via the keyboard or pointing device), returns to the first operating mode and re-implements the previous paging policy. Thus in both methods 400 and 500, when a user resumes activity with respect to the computing device, the user processes that the user was working with upon the period of inactivity commences will be maintained, to the extent possible, in memory, which leads to a quicker resumption of user activity because the user pages will not be forced to be reloaded from secondary storage. The reclamation paradigms of methods 400 and 500 thus lead to better system performance and improved user experience.

Example Computing Device

Figure 6:
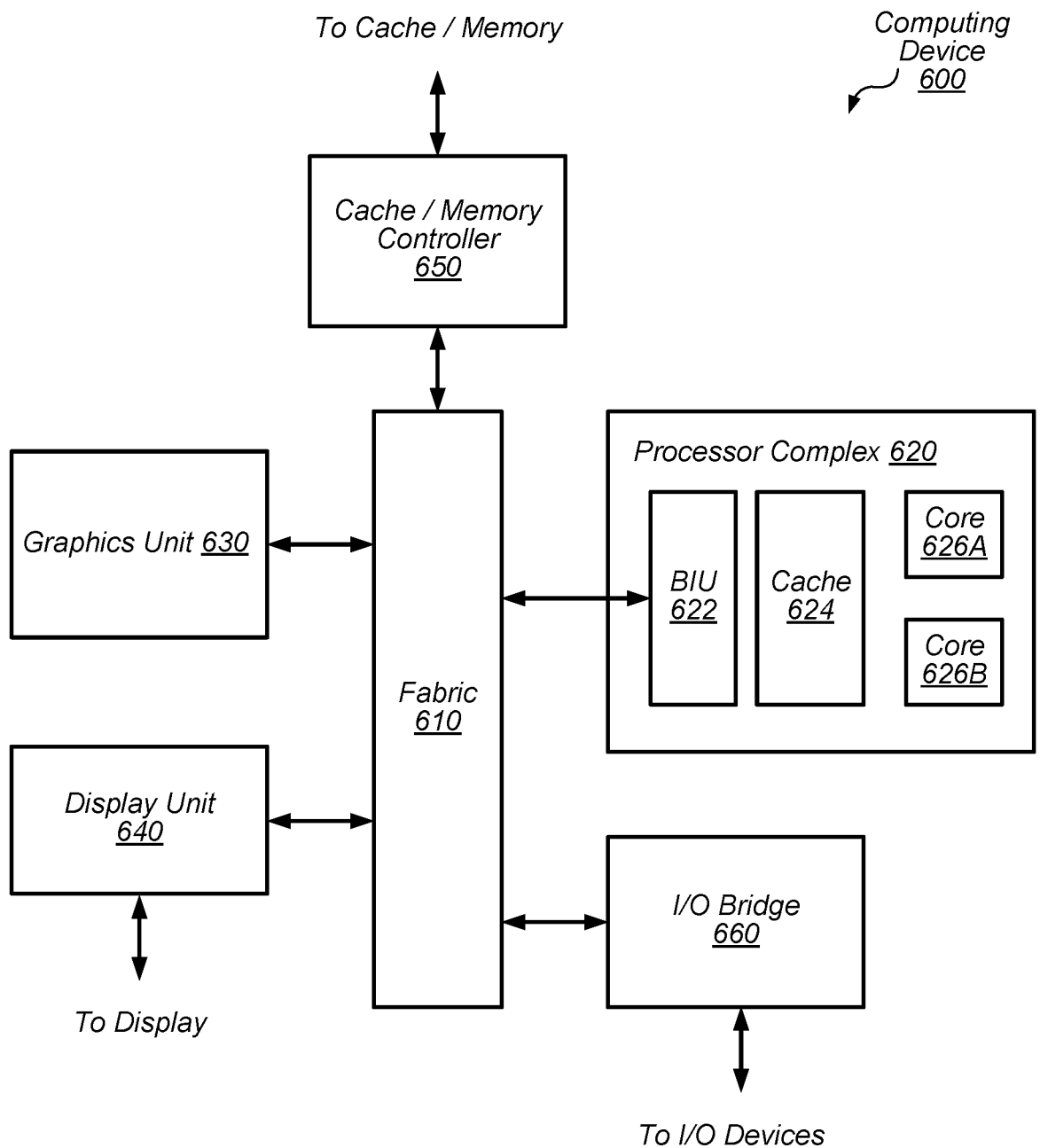
FIG. 6 is a block diagram illustrating an example computing device, according to some embodiments.

Turning now to FIG. 6, a block diagram illustrating an example embodiment of a computing device 600 is shown. In some embodiments, elements of device 600 may be included within a system on a chip (SOC). In some embodiments, device 600 may be included in a mobile device, which may be battery-powered. Therefore, power consumption by device 600 may be an important design consideration. In the illustrated embodiment, device 600 includes fabric 610, processor complex 620, graphics unit 630, display unit 640, cache/memory controller 650, input/output (I/O) bridge 660. In various embodiments, device 600 may further include MMU 250 and system management controller 260, described above.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements.

In the illustrated embodiment, processor complex 620 includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions. These instructions may be stored in computer readable medium such as a memory coupled to memory controller 650 discussed below.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 620 to cause device 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., wifi, Bluetooth, cellular, global positioning system, etc.), additional storage, such as storage 230 (e.g., RAM storage, solid state storage, or disk storage), user interface devices (e.g., keyboard, microphones, speakers, etc.), etc.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," "third," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

What is claimed is:

1. A method, comprising:
    implementing, by an operating system of a computing device during a first operating mode, a first page reclamation policy for pages corresponding to user processes and non-user processes, wherein the user processes correspond to one or more first software applications initiated by a user of the computing device, and wherein the non-user processes correspond to one or more second software applications that were not initiated by the user;
    entering, by the computing device, a second operating mode based on an indication of inactivity of the user of the computing device; and
    implementing, by the operating system during the second operating mode, a second page reclamation policy that prioritizes, relative to the first page reclamation policy, eviction of pages corresponding to non-user processes.

2. The method of claim 1, wherein the non-user processes include background processes, and wherein the second page reclamation policy, relative to the first page reclamation policy, evicts a higher percentage of pages corresponding to background processes than pages corresponding to user processes.

3. The method of claim 2, wherein the first page reclamation policy specifies a first page retention parameter for pages corresponding to background processes, and wherein the second page reclamation policy specifies a second, lower page retention parameter for the pages corresponding to background processes.

4. The method of claim 3, wherein the second, lower page retention parameter specifies an amount of pages corresponding to background processes to retain in memory during the second operating mode.

5. The method of claim 3, wherein, during implementation of the second page reclamation policy, the second, lower page retention parameter does not require that any pages for the non-user processes be kept in memory.

6. The method of claim 1, wherein the implementing the second page reclamation policy comprises:
    detecting, by the operating system, initiation of a first non-user process during the second operating mode; and
    designating, by the operating system, a plurality of pages allocated to the first non-user process as pages corresponding to a background process.

7. The method of claim 6, wherein the first non-user process is a system process.

8. The method of claim 1, wherein the first page reclamation policy specifies a third page retention parameter for pages corresponding to user processes to retain in memory during the first operating mode, and wherein the second page reclamation policy specifies a fourth page retention parameter for pages corresponding to user processes to retain in memory during the second operating mode, wherein the fourth page retention parameter is greater than the third page retention parameter.

9. The method of claim 1, wherein implementation of the second page reclamation policy specifies that all of the pages corresponding to user processes are to remain in memory until a transition back to the first operating mode.

10. The method of claim 1, further comprising:
    returning, by the computing device, to the first operating mode in response to a triggering event that indicates user activity with respect to the computing device; and
    upon reentering the first operating mode, re-implementing the first page reclamation policy.

11. A non-transitory, computer-readable medium having program instructions stored thereon that are executable by a computing device to perform operations comprising:
    implementing, by an operating system of the computing device during a first operating mode, a first page reclamation policy for pages corresponding to user processes and non-user processes, wherein the user processes correspond to one or more first software applications initiated by a user of the computing device, and wherein the non-user processes correspond to one or more second software applications that were not initiated by the user;
    entering, by the computing device, a second operating mode based on an indication of inactivity of the user of the computing device; and
    implementing, by the operating system during the second operating mode, a second page reclamation policy that prioritizes, relative to the first page reclamation policy, eviction of pages corresponding to non-user processes.

12. The non-transitory, computer-readable medium of claim 11, wherein the non-user processes include background processes, and wherein the second page reclamation policy, relative to the first page reclamation policy, evicts a higher percentage of pages corresponding to background processes than pages corresponding to user processes.

13. The non-transitory, computer-readable medium of claim 12, wherein the first page reclamation policy specifies a first page retention parameter for pages corresponding to background processes, and wherein the second page reclamation policy specifies a second, lower page retention parameter for the pages corresponding to background processes.

14. The non-transitory, computer-readable medium of claim 13, wherein, during implementation of the second page reclamation policy, the second, lower page retention parameter does not require that any pages for the non-user processes be kept in memory.

15. The non-transitory, computer-readable medium of claim 11, wherein the implementing the second page reclamation policy comprises:
    detecting, by the operating system, initiation of a first non-user process during the second operating mode; and
    designating, by the operating system, a plurality of pages allocated to the first non-user process as pages corresponding to a background process.

16. A computing device, comprising:
    at least one processor; and
    a non-transitory, computer-readable medium having program instructions stored thereon that are executable by the at least one processor to perform operations comprising:
        implementing, by an operating system of the computing device during a first operating mode, a first page reclamation policy for pages corresponding to user processes and non-user processes, wherein the user processes correspond to one or more first software applications initiated by a user of the computing device, and wherein the non-user processes correspond to one or more second software applications that were not initiated by the user;
        entering, by the computing device, a second operating mode based on an indication of inactivity of the user of the computing device; and implementing, by the operating system during the second operating mode, a second page reclamation policy that prioritizes, relative to the first page reclamation policy, eviction of pages corresponding to non-user processes.

17. The computing device of claim 16, wherein the non-user processes include background processes, and wherein the second page reclamation policy, relative to the first page reclamation policy, evicts a higher percentage of pages corresponding to background processes than pages corresponding to user processes.

18. The computing device of claim 17, wherein the first page reclamation policy specifies a first page retention parameter for pages corresponding to background processes, and wherein the second page reclamation policy specifies a second, lower page retention parameter for the pages corresponding to background processes.

19. The computing device of claim 16, wherein the implementing the second page reclamation policy comprises:
   in response to a page fault, moving, by the operating system, one or more pages corresponding to non-user processes to a front of a swap queue in a compressor pool.

20. The computing device of claim 19, wherein the implementing the second page reclamation policy further comprises:
   moving, by the operating system, the one or more pages corresponding to background processes from a swap space on a storage device to the front of the swap queue.

* * * * *